(No Model.)
J. R. SHOEMAKER.
COMPENSATION WATCH BALANCE.
No. 468,968. Patented Feb. 16, 1892.
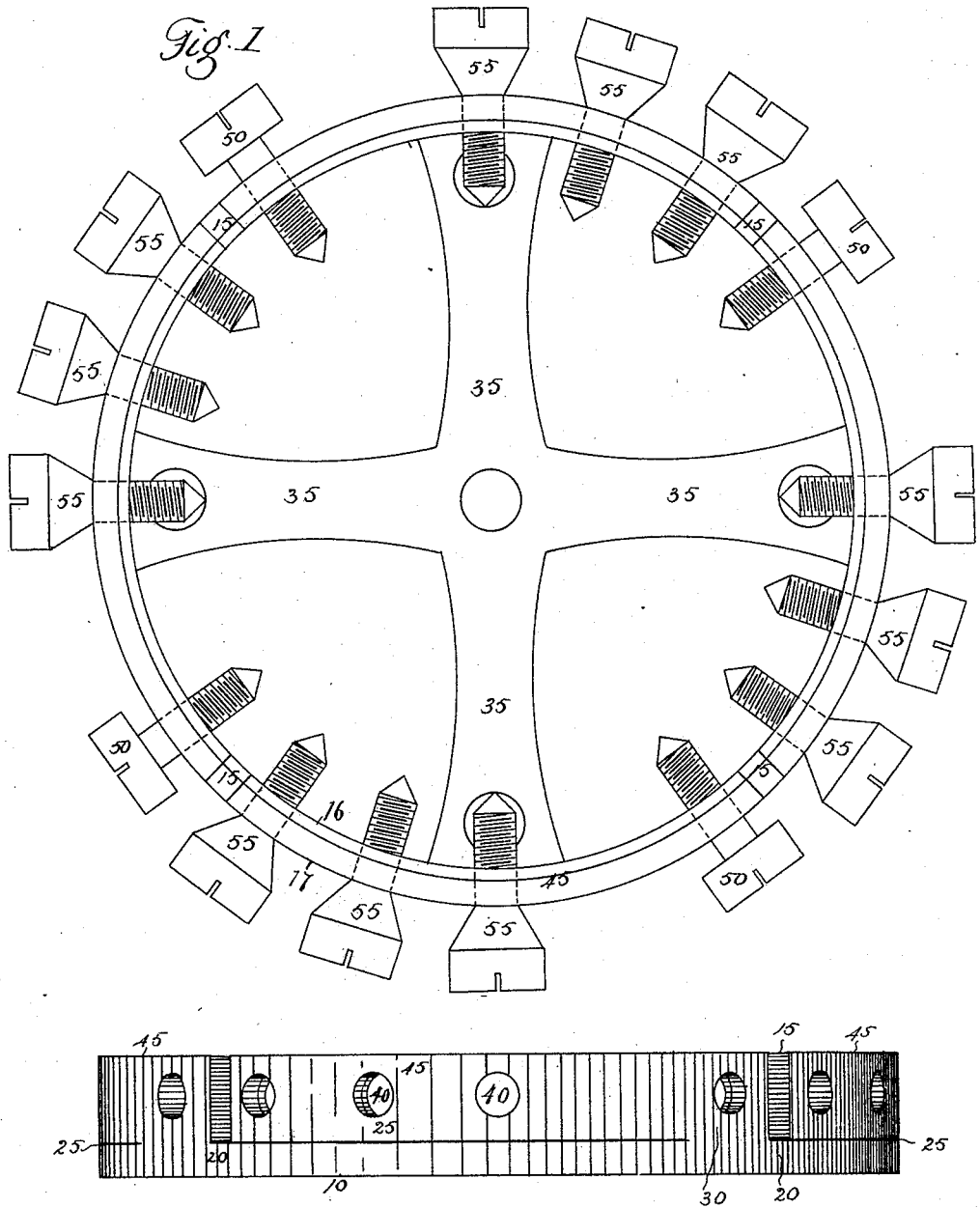

UNITED STATES PATENT OFFICE.

JOSEPH R. SHOEMAKER, OF DENVER, COLORADO.

COMPENSATION WATCH-BALANCE.

SPECIFICATION forming part of Letters Patent No. 468,968, dated February 16, 1892.

Application filed March 30, 1891. Serial No. 386,896. (No model.)

*To all whom it may concern:*

Be it known that I, JOSEPH R. SHOEMAKER, a citizen of the United States of America, residing at Denver, in the county of Arapahoe and State of Colorado, have invented certain new and useful Improvements in Compensation-Balances; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in compensation-balances for time-pieces or a balance designed to make isochronal vibrations or oscillations, notwithstanding changes of temperature; and the object of the improvement is to provide a balance capable of maintaining its poise at varying temperatures and which shall be far superior to the ordinary balance in point of durability and usefulness.

As heretofore made it is believed that the best compensation-balance consists of a rim composed of an inner layer of steel and an outer layer of brass, said rim being divided or cut entirely through at two diametrically-opposite points, forming two sections connected with the center of the wheel by two radial arms, the rim being provided with the large headed screws, forming weights. This usual form of balance is defective in many respects, among which defects may be mentioned its great difficulty of adjustment for compensation purposes, the weakness of its structure and consequent susceptibility to injury, the ease with which it is thrown out of poise, and the difficulty of readjustment.

The aforesaid defects are believed to be overcome in my improved balance, in which the rim is only cut partially through, a continuous strip being left entirely around the rim. From the bottom of each transverse slot and at right angles or approximately at right angles thereto the rim is cut parallel with or approximately parallel with its edges around toward the next transverse slot, but terminating at a suitable distance therefrom, each slit extending from its slot around the rim in the same direction. The adjustable screws are placed in the transverse spaces between the transverse slots and the termination of the longitudinal slits, while the weight-screws are located in the movable parts bounded on three sides by the edge of the rim, the slit parallel thereto, and the transverse slot.

My improved device will be better understood by reference to the accompanying drawings, wherein is illustrated an embodiment of the invention.

In the drawings, Figure 1 is a top or plan view, on an enlarged scale, of my improved compensation-balance, while Fig. 2 is an edge view of the same with the screws removed.

In the views, wherein similar reference characters indicate corresponding parts of the mechanism, let the numeral 10 designate the rim of the wheel, composed of an inner plate or layer 16 of steel and an outer plate or layer 17 of brass soldered or fused together, or the rim may be composed of any other suitable metals or materials, being in this respect substantially of the same construction as the rim of the ordinary compensation-balance.

The rim in my improvement is provided with transverse slots 15, cut through one edge toward the opposite edge, but terminating so as to leave a strip 20 of suitable width between the bottom of the slot and the opposite edge of the rim. From the bottom of each slot a slit 25 is cut through the rim around toward the opposite slot 15, but terminating a sufficient distance therefrom to leave a continuous transverse part 30 between the edges of the rim. The number of slots 15 may be two or more, preferably four, as shown in the drawings, in which case the wheel is provided with two or more radial arms 35, four being shown in the drawings, each terminating at its outer extremity in the rim. The arms 35 may terminate in the solid or continuous portions 20 of the rim or they may engage the parts 30. The rim of the wheel is also provided with threaded openings 40, one located in each part 30 and the others in the movable parts 45. In each opening in parts 30 is inserted an adjustable time-screw 50, while in the other openings are placed the weight-screws 55.

It will be observed that this construction is well calculated to compensate for the varying tension of the hair-spring by decreasing the moment of inertia in the balance as the spring expands or lengthens with heat and by increasing the moment of inertia as the opposite effect is produced upon the spring by a lower temperature. It will also be observed that the poise of the balance is maintained by reason of the fact that the movable arms 45, with their weights, are carried equally inward as the metal expands and equally outward as it contracts under the influence of varying temperatures; and finally it may be stated that arms 45, with their screws forming in effect weights, afford ample scope for varying the moment of inertia in the balance, to compensate for the expansion and contraction both of the hair-spring and the balance itself under the influence of varying temperatures, whereby the oscillations or vibrations of the balance are isochronal.

Having thus described my invention, what I claim is—

1. A compensation-balance for time-pieces, said balance having two or more transverse slots cut partially through its rim and a slit carried from each slot toward the adjacent slot, all the slits passing around the rim in the same direction and each slit terminating before reaching the slot toward which it extends, substantially as described.

2. A compensation-balance consisting of an endless rim provided with movable arms formed integral with or attached to projections from the edge of the rim, the arms lying in a different plane from the rim, substantially as described.

3. A compensation-balance having an endless rim provided with movable weighted arms attached thereto and lying in a different plane, substantially as described.

4. A compensation-balance wheel for time-pieces, consisting of a continuous strip entirely around the rim, forming a base, as it were, arms formed by a transverse slot, and a longitudinal slit cut in the rim above said base and provided with weights, the arms being formed, preferably, integral with the rim, and transverse portions 30 lying between each arm and the adjacent transverse slot, said parts 30 being provided with adjustable time-screws, whereby the balance-wheel makes isochronal vibrations, oscillations, or beats, notwithstanding changes of temperature, substantially as described.

5. A compensation-balance consisting of an endless rim or ring provided with vibrating arms secured at one extremity to the body of the rim and lying in a different plane, substantially as described.

In testimony whereof I affix my signature in presence of two witnesses.

JOSEPH R. SHOEMAKER.

Witnesses:
WM. MCCONNELL,
G. J. ROLLANDET.